(12) United States Patent
Kuo

(10) Patent No.: US 6,498,737 B1
(45) Date of Patent: Dec. 24, 2002

(54) VOLTAGE REGULATOR WITH LOW SENSITIVITY TO BODY EFFECT

(75) Inventor: Cheng-Hsiung Kuo, Tainan (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/050,445

(22) Filed: Jan. 16, 2002

(51) Int. Cl.[7] ................................................ H02M 3/18
(52) U.S. Cl. .......................................... 363/59; 327/536
(58) Field of Search ..................... 363/59, 60; 323/313, 323/315; 327/535, 536, 537, 538, 540, 543

(56) References Cited

U.S. PATENT DOCUMENTS

| | | | | |
|---|---|---|---|---|
| 5,029,282 A | * | 7/1991 | Ito | ........................... 307/296.8 |
| 5,097,303 A | * | 3/1992 | Taguchi | ..................... 357/23.6 |
| 5,767,736 A | * | 6/1998 | Lakshmikumar et al. | ... 327/536 |
| 5,783,934 A | * | 7/1998 | Tran | ........................... 323/312 |
| 5,955,874 A | * | 9/1999 | Zhou et al. | ................. 323/315 |
| 6,255,872 B1 | * | 7/2001 | Harada et al. | .............. 327/157 |

* cited by examiner

Primary Examiner—Matthew Nguyen
(74) Attorney, Agent, or Firm—George O. Saile; Stephen B. Ackerman

(57) ABSTRACT

This invention provides a circuit and a method for regulating the voltage of semiconductor integrated circuits. It provides the ability to accurately regulate voltage on chips by eliminating the sensitivity due to temperature, process and noise by eliminating the problems introduced by body effect. The invention utilizes a charge pump, a PN diode, diode connected NMOS field effect transistors, one or more intrinsic NMOS field effect transistors, a current mirror discharge NMOS field effect transistor, a current source and, a diode connected NMOS field effect transistor current mirror.

29 Claims, 1 Drawing Sheet

VOLTAGE REGULATOR WITH LOW SENSITIVITY TO BODY EFFECT

BACKGROUND OF THE INVENTION

1. Field of the Invention

This invention relates to a circuit and a method for regulating voltage with low sensitivity to body effect in semiconductors.

More particularly this invention relates to the use of intrinsic transistors to fine-tune the regulation voltage.

2. Description of Related Art

Many applications implemented on today's semiconductor chips require accurate voltages. A classic example is writeable memory which requires that the amplitude of the erase voltage to exactly balance the write voltage of the writeable memory cells. If the erase voltage does not accurately match the write voltage, the memory cell will continue to store a '1' value instead of the intended '0' value. To insure that the write voltage and erase voltage are generated properly, an on-chip voltage regulation circuit is required. There are several on-chip and environmental effects which counteract the regulation of on-chip voltages. These include temperature effects, process variations and noise interference. Temperature effects the resistance, capacitance and current flow on chip. In addition, process variations affect the line spacings and oxide, metal and semiconductor thicknesses affect the on-chip voltages. There is one semiconductor chip design item which affects the threshold voltages and other voltages on chip. The body effect is a threshold voltage shift that occurs when there is a back bias Between the source and the body or the bulk of a transistor. In this case, the source of the field effect transistor is not coupled to ground, but the bulk is connected to ground. The above case represents the back-bias effect. This back-bias effect adds to the threshold voltage shift caused by the temperature and process variation. The problem of back-bias body effect is solved in this invention.

U.S. Pat. No. 5,955,874 (Zhou et al) "Supply Voltage-independent Reference Voltage Circuit" describes a voltage reference circuit comprising intrinsic MOS transistors. The circuit is independent of voltage supply and insensitive to process and temperature variations.

U.S. Pat. No. 5,783,934 (Tran) "CMOS Voltage Regulator with Diode-Connected Transistor Divider Circuit" describes a CMOS voltage regulator. This voltage regulator is configured in a negative feedback operational amplifier loop with diode connected p-MOS FETs serving as a resistor divider.

U.S. Pat. No. 5,097,303 (Taguchi) "On-Chip Voltage Regulator and Semiconductor Memory Device Using the Same" discloses a voltage regulator comprising diode-connected MOS transistors. The internal chip voltage created is little affected by variations in the load current and consumes a small amount of current in stand by mode.

U.S. Pat. No. 5,029,282 (Ito) "Voltage Regulator Circuit" discloses a regulator made up of diode connected MOS FETs. This regulator circuit is ideal for an integrated circuit with a charge pump circuit having a voltage output terminal.

BRIEF SUMMARY OF THE INVENTION

It is the objective of this invention to provide a circuit and a method for for regulating the voltage for semiconductor integrated circuits.

It is further an object of this invention to accurately regulate voltage on chips by eliminating the sensitivity due to temperature, process and noise by eliminating the problems introduced by body effect.

The objects of this invention are achieved by a circuit that provides voltage regulation using a charge pump, a PN diode, diode connected NMOS field effect transistors, an intrinsic NMOS field effect transistor, a current mirror discharge NMOS field effect transistor, a current source and, a diode connected NMOS field effect transistor current mirror.

The problem of back-bias body effect is solved in this invention by using one or more intrinsic MOS field effect transistors. Intrinsic MOS FETs have low threshold voltage, Vt. In fact, more than one intrinsic transistor can be applied into the diode chain in order to generate the proper regulation voltage level. Therefore, this voltage regulator output stage generates a regulated voltage equal to the sum of the breakdown voltage Vbd of said PN diode, the threshold voltages, Vtn, of said N diode connected NMOS field effect transistors including the intrinsic MOS transistors which are also diode-connected, and the drain-to-source voltage, Vds of said current mirror discharge NMOS field effect transistor.

$$Vpp = Vbd + Vt1 + Vt2 + \ldots + Vtn + Vds$$

In summary, if we use intrinsic MOS with low sensitivity to body effect as the components of the voltage regulator, the regulation voltage will also have low sensitivity to body effect. This reduces the back bias effect to the regulator. Also, this circuit of this invention uses the grounding of the sources of the current mirror MOS transistors. This also reduces the back-bias effect.

DETAILED DESCRIPTION OF THE INVENTION

Figure 1:
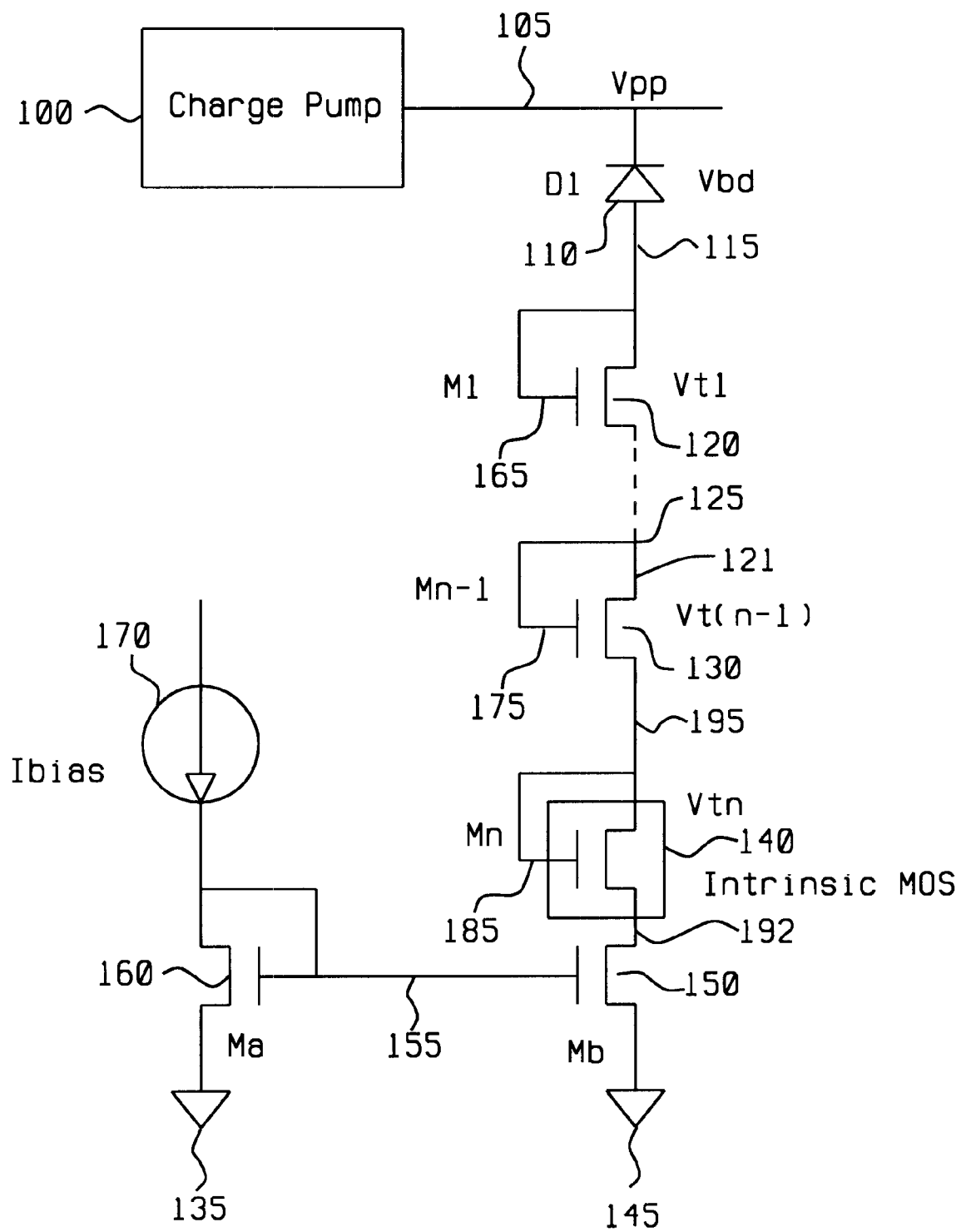
FIG. 1 gives the main circuit embodiment of this invention illustrating the voltage regulator design.

FIG. 1 shows the main circuit embodiment of this invention. The charge pump 100 shown represents any on-chip voltage generating circuitry. For example, this could be the Write or Erase voltages associated with a writeable flash memory or EEPROM, electrically erasable programmable read only memory. The voltage Vpp 105 represents the voltage output from the charge pump. Voltage Vpp 105 is the voltage to be regulated by the circuitry of this invention in FIG. 1. Voltage regulation means to maintain the Vpp voltage constant within a specified tolerance. The voltage regulation attempts to eliminate or reduce the variations caused by temperature, process or noise variations.

The balance of the circuitry in FIG. 1 will be referred to as the voltage regulator output stage. The first device in this stage is the reversed biased PN junction diode D1 110. The N-node of this diode is connected to Vpp, the output voltage. The P-node of this diode is node 115. This reversed biased PN diode is used as the first component of the voltage regulator output stage. This output stage is used to clamp the output voltage Vpp to the required specified value. Connected in series with the PN diode are a series connection of N diode connected NMOS field effect transistors. The number N of diode connected NMOS FETs is determined by the required voltage level of the output voltage Vpp. A diode connected NMOS FET is an FET device M1 which has its drain 115 and gate 165 connected together. This type of connection results in a PN diode where the drain and gate form the P part of the diode. The source 121 forms the N part of the diode. The threshold voltage of M1 is Vt1.

The second, third, etc. diode connected NMOS FET is represented by the generalized case of device Mn−1 130 in FIG. 1. Again, the gate 175 and drain 125 are tied together. The gate-drain node of device Mn−1 is connected to the source of M1 121 in FIG. 1. The threshold voltage of device Mn−1 is Vt(n−1). The source 195 of device Mn−1 is connected to the drain of a diode connected intrinsic NMOS FET 140. The gate 185 and the drain of this intrinsic NMOS FET 140 are tied together. This intrinsic FET has a low threshold voltage, Vt. This intrinsic NMOS FET also has a low sensitivity to body effect.

Generally speaking, an intrinsic NMOS FET has a low Vt, because it is an NMOS device without doping concentration or with very light doping concentration in the FET device channel area. The intrinsic NMOS FET has a low sensitivity to body effect, because the NMOS FET Vt is related to the body effect coefficient which is also related to doping concentration. Due to the light doping concentration (or no doping concentration) of the NMOS FET channel, the intrinsic NMOS FET has a low sensitivity to body effect.

The intrinsic NMOS FET 140 is used for fine-tuning of the specified target voltage, Vpp. The diode connected NMOS field effect transistors 130 are cascaded to approach the value of Vpp 105. Then, the intrinsic NMOS FET 140 is used for fine tuning the final value of Vpp to its exact required value.

A current mirror discharge NMOS field effect transistor 150 has its drain connected to the source of the intrinsic NMOS FET. The source of the current mirror discharge NMOS FET 150 is connected to ground. The gate of the current mirror discharge NMOS FET 150 is connected to the gate of the diode connected NMOS current mirror 160. This current mirror discharge NMOS FET has the same current bias as the diode connected NMOS current mirror 160.

The diode connected NMOS current mirror FET 160 has its drain connected to the current source, Ibias 170. The current mirror FET has its source connected to ground 135 and its gate 155 is connected to its drain and also connected to the gate of the current mirror discharge NMOS FET. The current source Ibias sets the current bias for the entire voltage regulator circuit of this invention. The current value of the Ibias current source is designed to deliver the nominal voltage, which is very near to the required specified voltage Vpp. Recall the intrinsic NMOS FET 140 produces the exact voltage required at Vpp via fine-tuning. The current source Ibias delivers the bias current to the diode connected NMOS FET 160. This established a voltage on node 150. This nodal voltage drives the current mirror discharge NMOS FET gate. This causes the same Ibias current to travel through this current mirror discharge NMOS FET 150.

The advantage of the voltage regulator of this invention is the use of the intrinsic diode connected NMOS field effect transistor. Since the intrinsic FET has a low threshold voltage, Vt and since it is not sensitive to body effect, the intrinsic diode provides for a stable output voltage at Vpp.

While this invention has been particularly shown and described with Reference to the preferred embodiments thereof, it will be understood by those Skilled in the art that various changes in form and details may be made without Departing from the spirit and scope of this invention.

What is claimed is:

1. A circuit which provides voltage regulation comprising:
   a charge pump which drives the voltage to be regulated,
   a PN diode whose N side is connected to the charge pump,
   diode connected NMOS field effect transistors connected in series to each other, the first of which is connected to the P side of said PN diode,
   a single or several intrinsic NMOS field effect transistors connected to the last of said diode connected field effect transistors,
   a current mirror discharge NMOS field effect transistor whose drain is connected to the source of said intrinsic NMOS field effect transistors and whose source is connected to ground,
   a diode connected NMOS field effect transistor current mirror whose source is connected to ground and,
   a current source which drives said the drain of said diode connected NMOS field effect transistor.

2. The circuit of claim 1 wherein said charge pump is used for outputting a specified voltage such as the voltage to program a flash memory.

3. The circuit of claim 1 wherein said charge pump is connected to the N-terminal of said PN diode.

4. The circuit of claim 1 wherein said diode is used as a component of a voltage regulator output stage.

5. The circuit of claim 4 wherein said voltage regulator output stage is used to clamp the output voltage to the required level.

6. The circuit of claim 4 wherein said voltage regulator output stage is made up of said reverse biased PN diode, N diode connected NMOS field effect transistors, an intrinsic NMOS field effect transistor, and a current mirror discharge NMOS field effect transistor.

7. The circuit of claim 4 wherein said voltage regulator output stage generates a regulated voltage equal to the sum of the breakdown voltage Vbd of said PN diode, the threshold voltages, Vtn, of said N diode connected NMOS field effect transistors, and the drain-to-source voltage, Vds of said current mirror discharge NMOS field effect transistor.

$$Vpp=Vbd+Vt1+Vt2+\ldots+Vtn+Vds.$$

8. The circuit of claim 1 wherein said PN diode has its P-side connected to the drain of the first of a series of diode connected NMOS field effect transistors.

9. The circuit of claim 1 wherein said diode connected NMOS field effect transistor #1 is used to clamp the charge pump output voltage at a specified level as sub components of said voltage regulation output stage.

10. The circuit of claim 1 wherein said diode connected NMOS field effect transistor #1 has its gate and drain connected in common.

11. The circuit of claim 1 wherein said diode connected NMOS field effect transistor #2 is used to clamp the charge pump output voltage at a specified level as sub components of said voltage regulation output stage.

12. The circuit of claim 1 wherein said diode connected NMOS field effect transistor #2 has its gate and drain connected in common.

13. The circuit of claim 1 wherein said diode connected NMOS field effect transistor #N is used to clamp the charge pump output voltage at a specified level as sub components of said voltage regulation output stage.

14. The circuit of claim 1 wherein said diode connected NMOS field effect transistor #N has its gate and drain connected in common.

15. The circuit of claim 1 wherein said intrinsic MOS field effect transistor has a low threshold voltage, Vt.

16. The circuit of claim 1 wherein said intrinsic MOS field effect transistor or transistors have a low sensitivity to body effect.

17. The circuit of claim 1 wherein said intrinsic MOS field effect transistor is used for fine-tuning of a specified target voltage to be regulated.

18. The circuit of claim 1 wherein said intrinsic NMOS field effect transistor has its gate connected to its drain which is connected to the source of said NMOS field effect transistor #N.

19. The circuit of claim 1 wherein said intrinsic NMOS field effect transistor has its source connected to said current mirror discharge NMOS field effect transistor.

20. The circuit of claim 1 wherein said current mirror discharge NMOS field effect transistor is used for discharging to ground the series path of said reference PN diode and N diode connected NMOS field effect transistors.

21. The circuit of claim 1 wherein said current mirror NMOS field effect transistor has its drain connected to the source of said NMOS intrinsic field effect transistors, has its source connected to ground, and has its gate connected to the gate of said diode connected NMOS field effect transistor current mirror.

22. The circuit of claim 21 wherein said intrinsic transistor or transistors can be used to reduce the back-bias effect to MOS.

23. The circuit of claim 1 wherein said current source is used for biasing the nominal operating point of this voltage regulator circuit.

24. The circuit of claim 1 wherein said current source is connected to the drain and gate of said diode connected NMOS field effect transistor current mirror.

25. The circuit of claim 1 wherein said diode connected NMOS field effect transistor current mirror is used for using the bias current source to develop a bias voltage and a mirrored current value in said current mirror discharge NMOS field effect transistor.

26. The circuit of claim 1 wherein said diode connected NMOS field effect transistor current mirror has its gate connected to its drain, has its source connected to ground, and also has its gate connected to the gate of said current mirror discharge NMOS field effect transistor.

27. A method which provides voltage regulation comprising the steps of:
   charge pumping,
   rectifying with a diode,
   cascading in series diode connected NMOS field effect transistors,
   using an intrinsic NMOS field effect transistor,
   discharging with a current mirror NMOS field effect transistor,
   sourcing current with a current source and,
   mirroring current with a diode connected NMOS field effect transistor.

28. The method of claim 27 further comprising the step of:
   generating a regulated voltage equal to the sum of the breakdown voltage Vbd of said PN diode, the threshold voltages, Vtn, of said N diode connected NMOS field effect transistors, and the drain-to-source voltage, Vds of said current mirror discharge NMOS field effect transistor.

$$Vpp=Vbd+Vt1+Vt2 + \ldots +Vtn +Vds.$$

29. The method of claim 27 further comprising the step of:
   using said intrinsic MOS field effect transistor for fine tuning of a specified target voltage to be regulated.

* * * * *